United States Patent
Yasui

Patent Number: 6,025,684
Date of Patent: Feb. 15, 2000

[54] SERVO-MOTOR DRIVING METHOD

[75] Inventor: Takaji Yasui, Nagano, Japan

[73] Assignee: Tamagawa Seiki Kabushiki Kaisha, Nagano-ken, Japan

[21] Appl. No.: 09/154,856

[22] Filed: Sep. 17, 1998

[30] Foreign Application Priority Data

Oct. 8, 1997 [JP] Japan ................................. 9-275901

[51] Int. Cl.$^7$ ................................................ H02K 17/32
[52] U.S. Cl. ........................ 318/434; 318/254; 318/138; 318/798; 318/439
[58] Field of Search .................... 318/254, 439, 318/138, 798, 434

[56] References Cited

U.S. PATENT DOCUMENTS

| | | | |
|---|---|---|---|
| 5,428,281 | 6/1995 | Seki et al. | 318/254 |
| 5,818,179 | 10/1998 | Kokami et al. | 318/254 |
| 5,847,521 | 12/1998 | Morikawa et al. | 318/254 |

FOREIGN PATENT DOCUMENTS 0 419 656 A1  1/1989  European Pat. Off. .

OTHER PUBLICATIONS

European Patent Office Action, dated Jul. 19, 1999.
Conference Record, Publication Date: Mar. 10, 1993, "Current Sensorless Field Oriented Control of Synchronous Reluctance Motor," Author(s): Takayoshi Matsuo and Thomas A. Lipo.

*Primary Examiner*—Karen Masih
*Attorney, Agent, or Firm*—Sughrue, Mion, Zinn, Macpeak & Seas, PLLC

[57] ABSTRACT

A method for driving a servo-motor detects a power voltage of a servo-motor determine a detected value. Through numeric calculation, the detected value is used to control a voltage command to a power converter, where the power converter supplies the proper currents to the servo-motor. The method does not require the use of a feedback loop, and thus, requires fewer components than the traditional method that also requires the use of a current sensor and an A/D converter.

7 Claims, 5 Drawing Sheets

SERVO-MOTOR DRIVING METHOD

BACKGROUND OF THE INVENTION

1. Field of the Invention

The present invention relates to a method for driving a servo-motor, and more particularly to a new improvement for detecting power voltage without using a current feedback loop, comprising a current sensor and an A/D converter, which is conventionally used for motor current detection, and controlling current using this detected value, thereby improving control properties and lowering cost.

2. Description of the Related Art

FIG. 1 shows a conventional method of this type which has generally been used as a method for driving a servo-motor.

That is, a current command Icmd is input to a calculator 1. The output 1a of the calculator 1 is sent via a proportional and/or integral controller 2 and is input as a voltage command 2a to a power converter 3, comprising a known power element configuration. The power converter 3 supplies a three-phase drive current Iu, Iv, Iw to a servo-motor 4. A current sensor 5 detects one part of the three-phase drive current Iu, Iv, Iw, and the detected current value Ivcc is input to the calculator 1 via an A/D converter 6, thereby forming a current feedback control.

Since the conventional servo-motor driving method has the configuration described above, it has problems such as the following.

That is, a current sensor and an expensive A/D converter are required in order to form the current feedback system, constituting a considerable obstacle to lowering the cost of the control system.

SUMMARY OF THE INVENTION

The present invention has been realized in order to solve the above problems and particularly aims to provide a method for driving a servo-motor wherein, by detecting power voltage without using a conventional current feedback loop for motor current detection and controlling current using this detected value, control properties can be improved and cost lowered.

The method for driving a servo-motor based on a current command of the present invention comprises the steps of: detecting a power voltage for driving the servo-motor; current-controlling a drive current of the servo-motor using a detected value of the power voltage; correcting a motor resistance, used in a numeric calculation of the current-controlling, using an estimated value of increase in motor resistance obtained using a command voltage, based on the current command, and an output power, which is the product of the power voltage and power current; and correcting changes in motor resistance caused by an increase in temperature of the servo-motor. Furthermore, the method of the present invention comprises performing a numeric calculation using motor resistance, motor inductance, an induced voltage constant and a torque constant. Furthermore, the method of the present invention comprises detecting motor overcurrent, which is a control irregularity of the servo-motor, when the equality $K \cdot Icmd \times kt \times \omega = Vcc \times Ivcc$ (where k is a proportional constant, Icmd is a motor current command, kt is the torque constant, $\omega$ is the motor speed, Vcc is the detected value of power voltage and Ivcc is the detected value of power current), which constitutes a normal control state, is not achieved. Moreover, the method of the present invention comprises performing the current-controlling using a reverse calculation system $Ra + Las$, which is reverse with respect to the calculation system of the servo-motor (where Ra is motor resistance, La is motor inductance and s is a Laplace operator).

DESCRIPTION OF THE PREFERRED EMBODIMENTS

Figure 1:
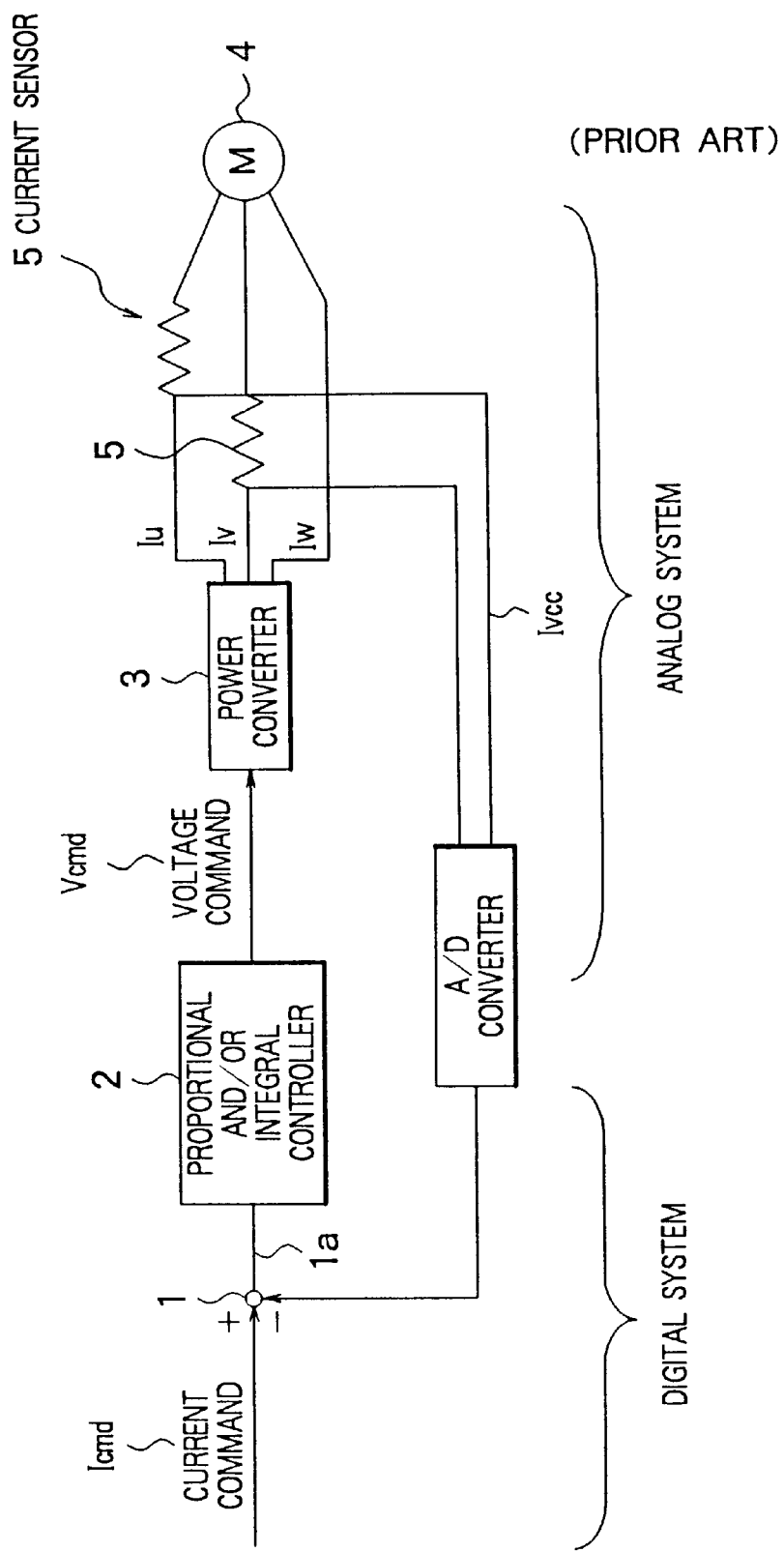
FIG. 1 is a block diagram showing a conventional control method.

There will be detailed below the preferred embodiments of the servo-motor driving method of the present invention with reference to the accompanying drawings. Like and similar members to the conventional example are explained using like reference characters.

Figure 2:
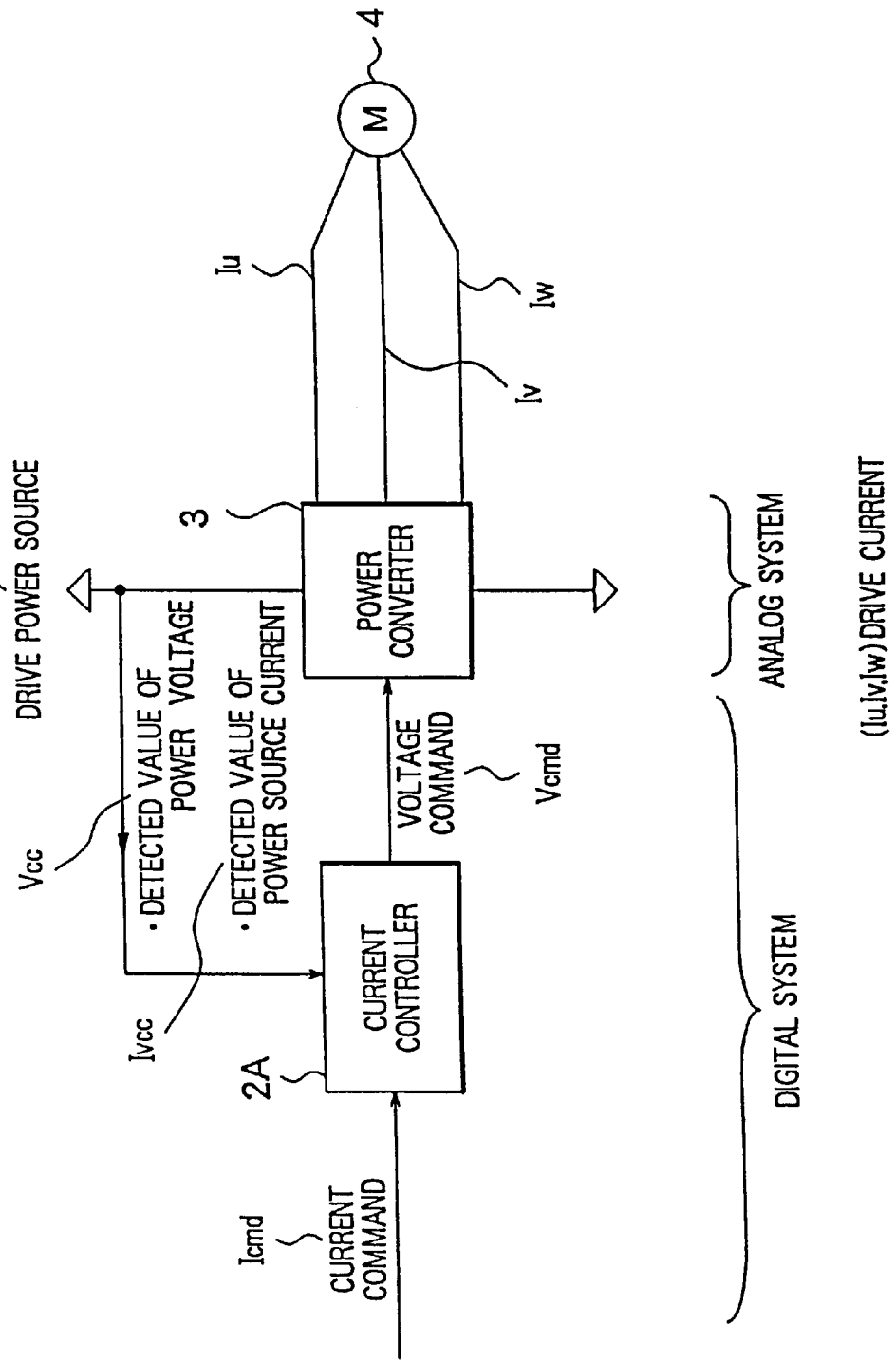
FIG. 2 is a block diagram showing a servo-motor driving method according to the present invention.

As shown in FIG. 2, current command Icmd, which comprises a current command value, is input to a current controller 2A and a voltage command Vcmd from the current controller 2A is applied to a known power converter 3. A drive power source 6, for driving power elements not shown in the diagram, is connected to the power converter 3. The power converter 3 supplies a three-phase drive current Iu, Iv, Iw to a servo-motor 4. Furthermore, a detected value Vcc of a power voltage V of the drive power source 6 and a detected value Ivcc of a power current I of the drive power source 6 are captured by the current controller 2A.

The control system shown in FIG. 2 differs from the conventional control system of FIG. 1 in respect of the fact that the current controller 2A applies a voltage command 2a, which is controlled using the detected value Vcc of the power voltage V and the detected value Ivcc of the power current I of the drive source 6, to the power converter 3. Then, the servo-motor 4 is drive-controlled by the three-phase drive current Iu, Iv, Iw obtained from the power converter 3.

Figure 3:
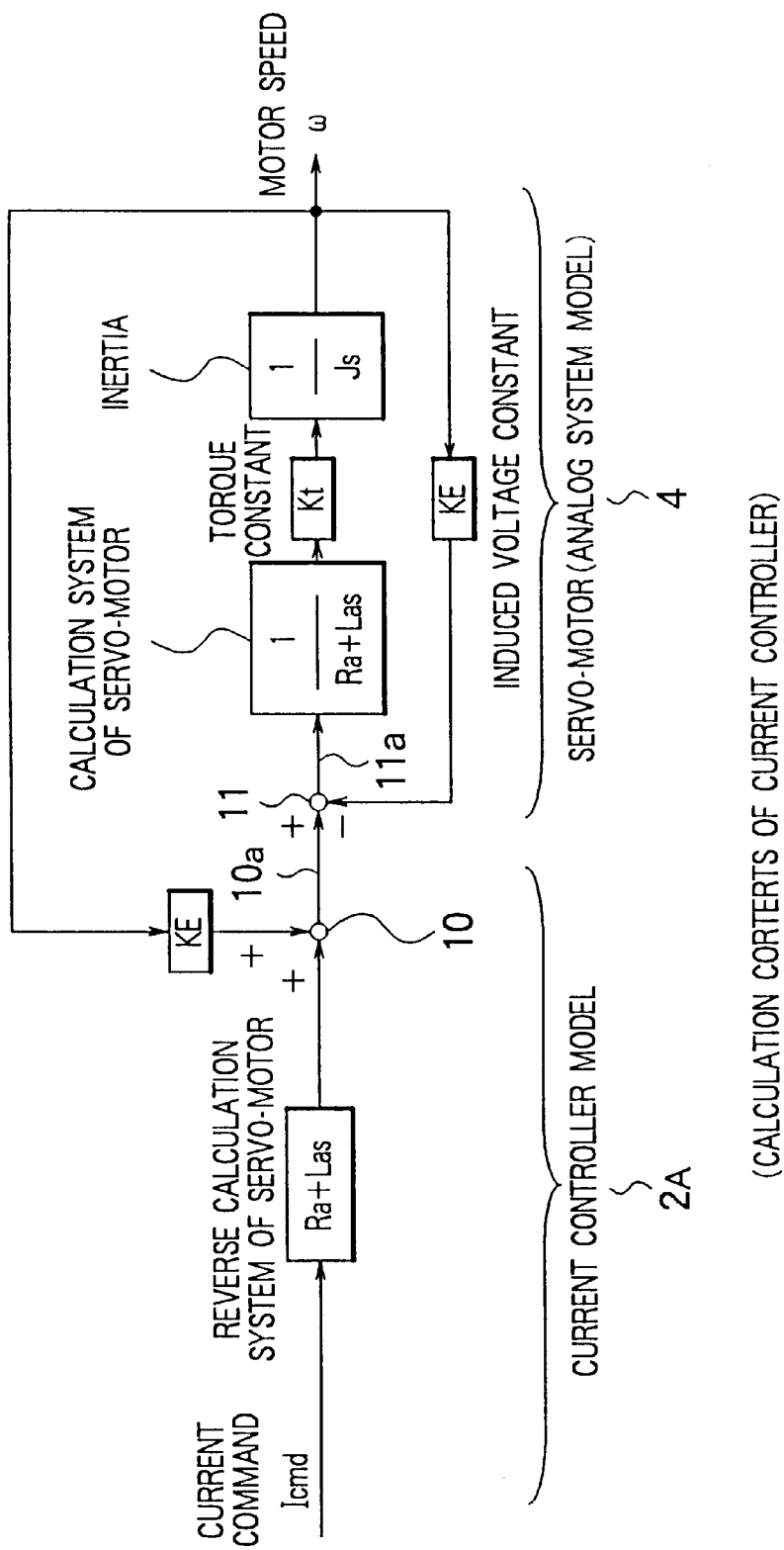
FIG. 3 is a control block diagram showing calculation contents of the current controller of FIG. 2.

Next, the calculation control of the current controller 2A will be explained more specifically. FIG. 3 shows the calculation contents of the servo-motor 4 and the current controller 2A as blocks. The current command Icmd is input to a first calculator 10 via a reverse calculation system (Ra+Las) which is reverse with respect to the calculation system (1/Ra+Las) of the servo-motor 4. The output 10a from the first calculator 10 is input to a second calculator 11. The output 11a of the second calculator 11 passes via the calculation system (1/Ra +Las), a torque constant kt and an inertia 1/Js, whereby a motor speed $\omega$ is obtained. Here, the abovementioned Ra represents motor resistance, La represents motor inductance and s represents a Laplace operator. Each induced voltage constant KE obtained from the motor speed $\omega$ is input to the calculators 10 and 11.

Figure 4:
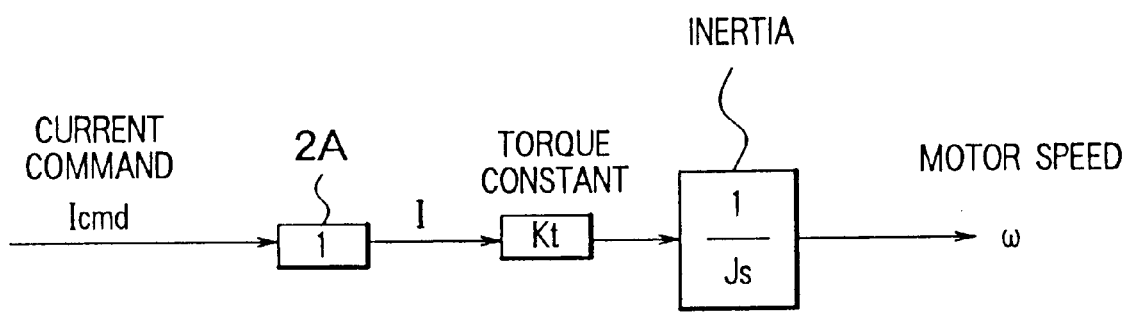
FIG. 4 is a control block diagram showing the normal control state of FIG. 3.

Next, when calculation control with the configuration of FIG. 3 is functioning normally, it reaches the calculation control state shown in FIG. 4, where the response of the current response loop of the servo-motor 4 is 1, and the current control system accurately follows the current target value. However, in the current control system shown in FIG.

4, in order to directly receive fluctuations in the power voltage V, a detected value Vcc of the power voltage V must be detected and the voltage command Vcmd must be corrected accordingly.

Figure 5:
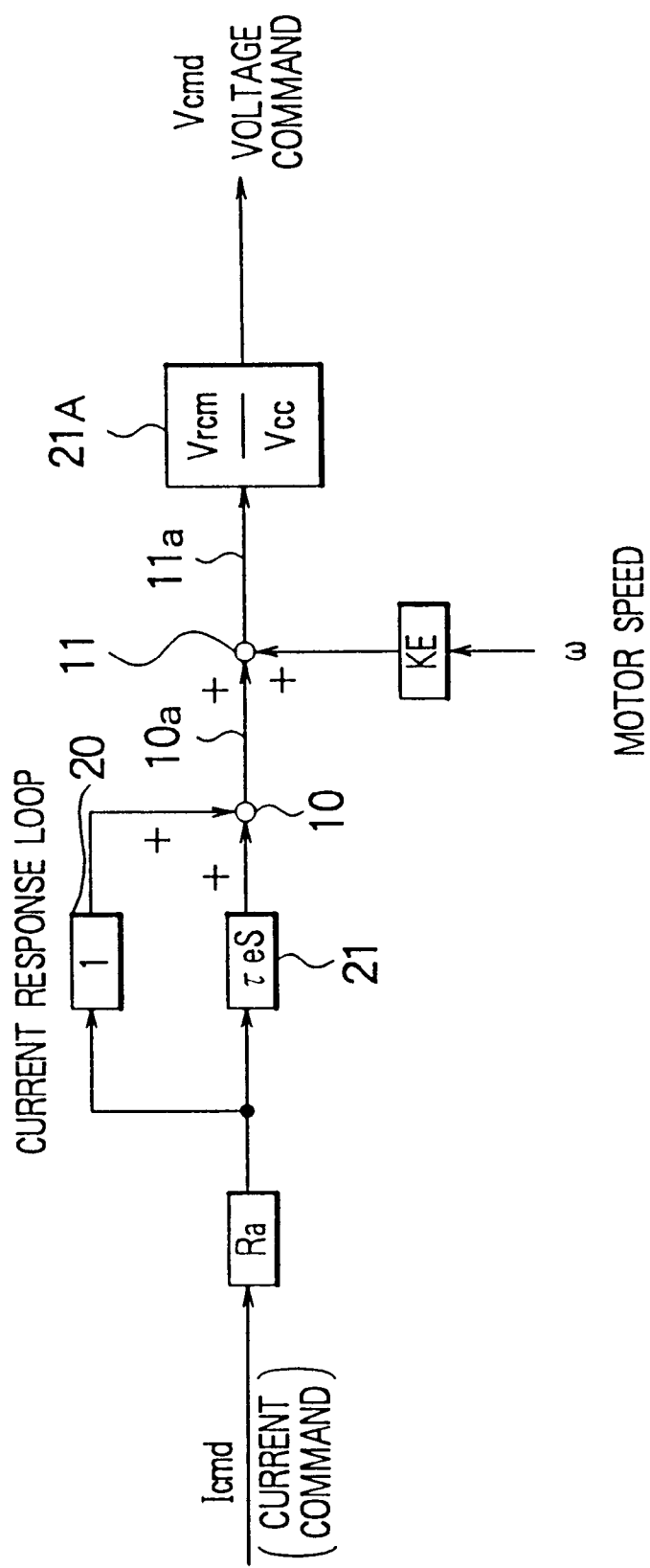
FIG. 5 is a block diagram for calculating a voltage command of the current controller of FIG. 2.

In order to perform the above correction, control is carried out by means of a numeric calculation using a calculation control system comprising the calculation control blocks shown in FIG. 5. Firstly, the current command Icmd is input to the second calculator 10 from the first calculator 10A via a first loop 20, wherein the response of the current response loop from the motor resistance R is 1, and a second-loop 21 (τes, a product of the electrical time-constant τe and the Laplace operator s, where τe is equal to La [motor inductance]/ Ra [motor resistance]) in the same way as already depicted in FIG. 3. A voltage calculator 21A controls the output 11a of the second calculator 11 by numeric calculation of Vcom/Vcc (where Vcom is a projected value of the power voltage V and Vcc is the detected value of the power voltage V). Then, the voltage command Vcmd, which has now been corrected in accordance with the fluctuation in the power voltage V, is applied to the power converter 3. The program sequence for calculating the voltage command Vcmd in FIG. 5 is expressed by equation (1) in the following expression:

$$Vcmd = \{Ra\ (Ik-\tau e\ /\ T\ [Ik-Ik-1]) + kE \cdot \omega k\} Vcom/Vcc \qquad [\text{Exp. 1}]$$

Ik—current command when sampling k

Ik-—current command when sampling (k−1)

ωk—motor speed when sampling k

T—sampling time

Ra—motor resistance

τe—electrical time-constant=La/Ra

La—motor inductance kE—Induced voltage constant

Vcom—projected value of power voltage

Vcc—detected value of power voltage

Vcmd—voltage command

Furthermore, during normal calculation control, an equality is achieved wherein K·Icmd×kt×ω=Vcc×Ivcc (where k is a proportional constant, Icmd is a motor current command, kt is the torque constant, ω is the motor speed, Vcc is the detected value of power voltage and Ivcc is the detected value of power current). Therefore, a case where the above equality is not achieved is determined to be a state of motor overcurrent, namely a control irregularity.

The servo-motor driving method of the present invention has the configuration described above and therefore obtains the following advantageous effects. That is, since the entire system can be controlled with a numeric calculation open loop, there is no need for the current feedback system using a current sensor and an A/D converter which has conventionally been used. The consequent reduction of parts enables cost to be reduced. In addition, deterioration of control precision caused by current sensor noise can be prevented. Furthermore, since changes in resistance due to increased temperature of the servo-motor are corrected, servo-motor rotation properties which are not dependent on temperature can be obtained, improving control performance.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A method for driving a servo-motor (4) based on a current command (Icmd), comprising the steps of:

detecting a power voltage (V) for driving said servo-motor (4); and current-controlling a drive current (Iu, Iv, Iw) of said servo-motor (4) using a detected value (Vcc) of said power voltage (V).

2. The method for driving a servo-motor (4) according to claim 1, wherein said current-controlling comprises performing a numeric calculation using motor resistance (Ra), motor inductance (La), an induced voltage constant (kE) and a torque constant (kt) of said servo-motor (4).

3. The method for driving a servo-motor (4) according to claim 1, further comprising:

detecting motor overcurrent, which is a control irregularity of said servo-motor (4), when an equality K·Icmd×kt×ω=Vcc×Ivcc (where k is a proportional constant, Icmd is a motor current command, kt is the torque constant, ω is the motor speed, Vcc is the detected value of power voltage and Ivcc is the detected value of power current), which constitutes a normal control state, is not achieved.

4. The method for driving a servo-motor (4) according to claim 2, further comprising:

detecting motor overcurrent, which is a control irregularity of said servo-motor (4), when an equality K·Icmd×kt×ω=Vcc×Ivcc (where k is a proportional constant, Icmd is a motor current command, kt is the torque constant, ω is the motor speed, Vcc is the detected value of power voltage and Ivcc is the detected value of power current), which constitutes a normal control state, is not achieved.

5. The method for driving a servo-motor (4) according to claim 1, wherein said current-controlling is performed using a reverse calculation system Ra+Las, which is reverse with respect to the calculation system of said servo-motor (4) (where Ra is motor resistance, La is motor inductance and s is a Laplace operator).

6. The method for driving a servo-motor (4) according to claim 2, wherein said current-controlling is performed using a reverse calculation system Ra+Las, which is reverse with respect to the calculation system of said servo-motor (4) (where Ra is motor resistance, La is motor inductance and s is a Laplace operator).

7. The method for driving a servo-motor (4) according to claim 3, wherein said current-controlling is performed using a reverse calculation system Ra+Las, which is reverse with respect to the calculation system of said servo-motor (4) (where Ra is motor resistance, La is motor inductance and s is a Laplace operator).

* * * * *